Aug. 28, 1945.  R. NEBOLSINE  2,383,496
METHOD OF AND APPARATUS FOR INSTALLING
LATERAL WELLS IN FLUID-SATURABLE EARTH
Filed March 6, 1941  5 Sheets-Sheet 1
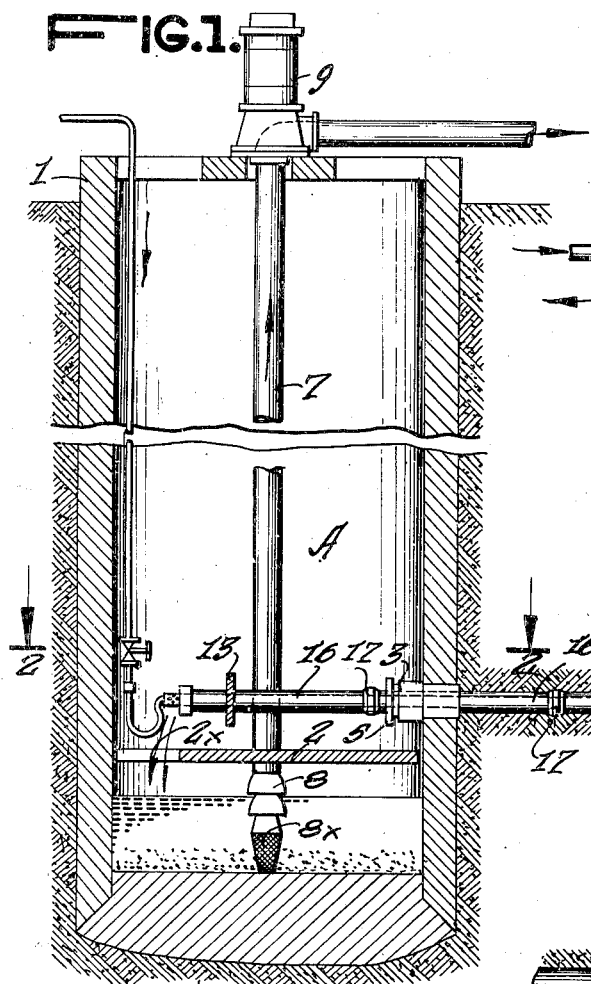
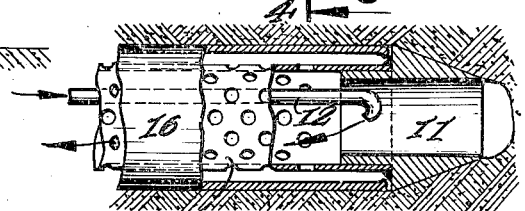
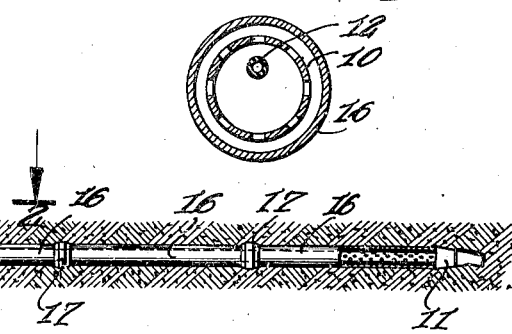
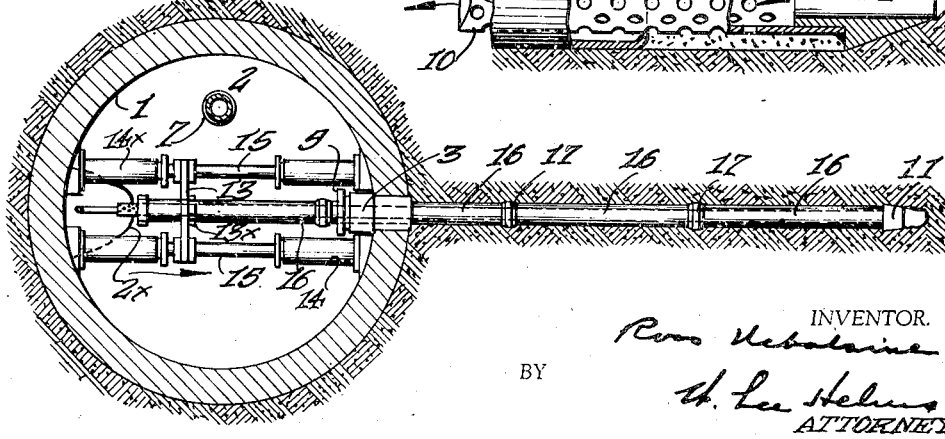

Aug. 28, 1945.  R. NEBOLSINE  2,383,496
METHOD OF AND APPARATUS FOR INSTALLING
LATERAL WELLS IN FLUID-SATURABLE EARTH
Filed March 6, 1941  5 Sheets-Sheet 2
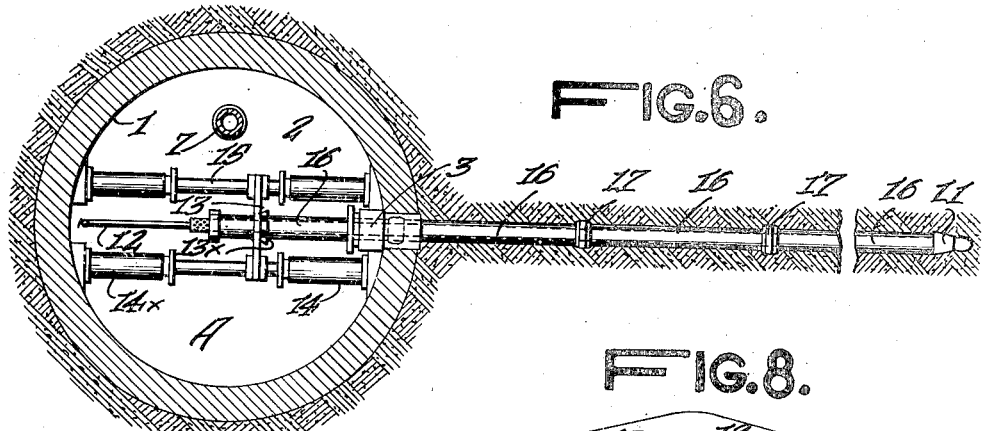
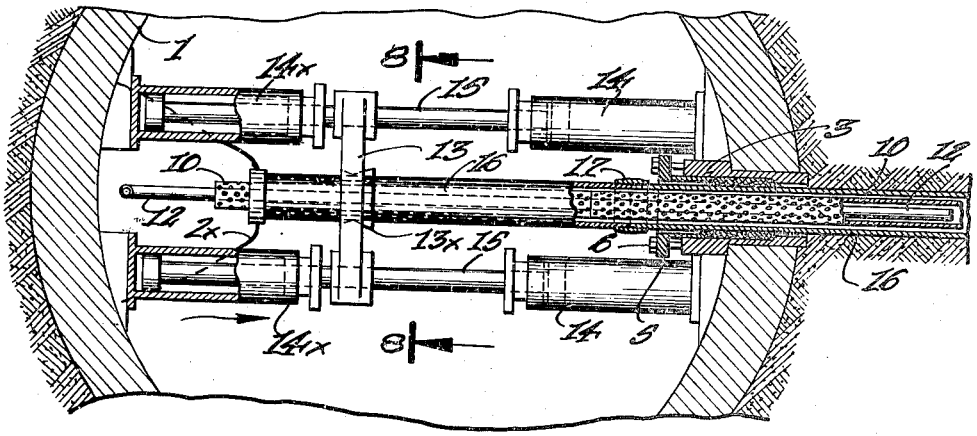
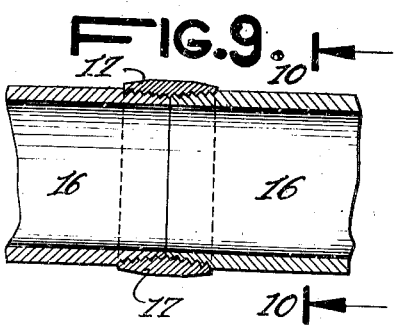
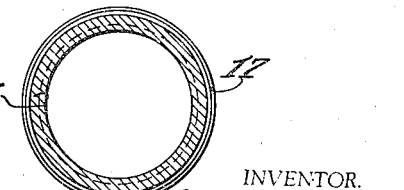
INVENTOR.
Roa Nebolsine
BY
ATTORNEY.

Aug. 28, 1945.  R. NEBOLSINE  2,383,496
METHOD OF AND APPARATUS FOR INSTALLING
LATERAL WELLS IN FLUID-SATURABLE EARTH
Filed March 6, 1941  5 Sheets-Sheet 3
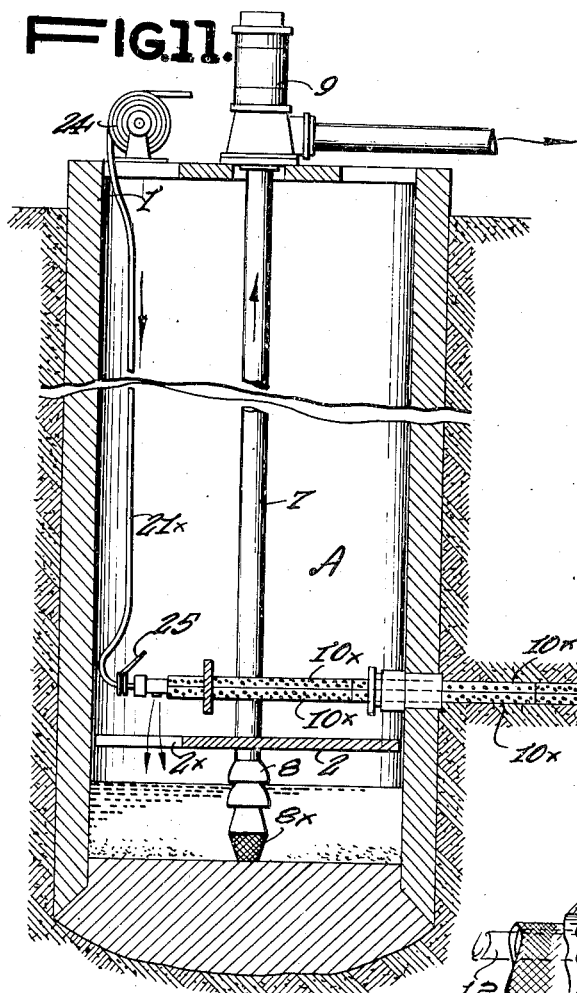
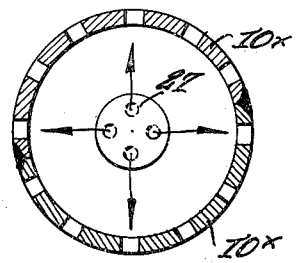
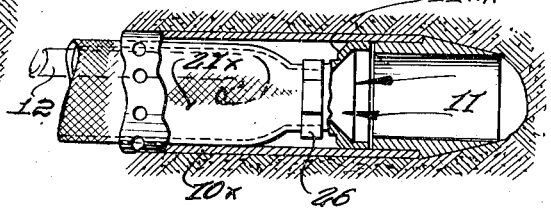
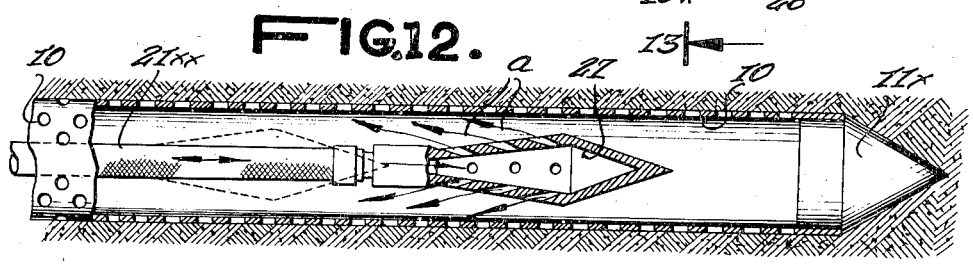
INVENTOR.
Ross Nebolsine
BY
W. Lee Helms
ATTORNEY.

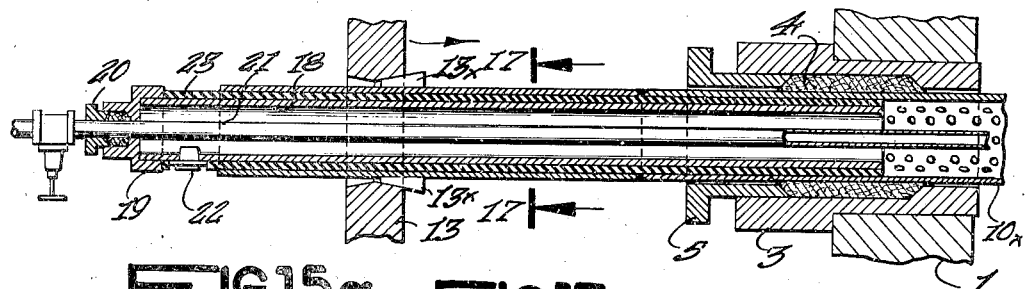

Aug. 28, 1945.  R. NEBOLSINE  2,383,496
METHOD OF AND APPARATUS FOR INSTALLING
LATERAL WELLS IN FLUID-SATURABLE EARTH
Filed March 6, 1941   5 Sheets-Sheet 5
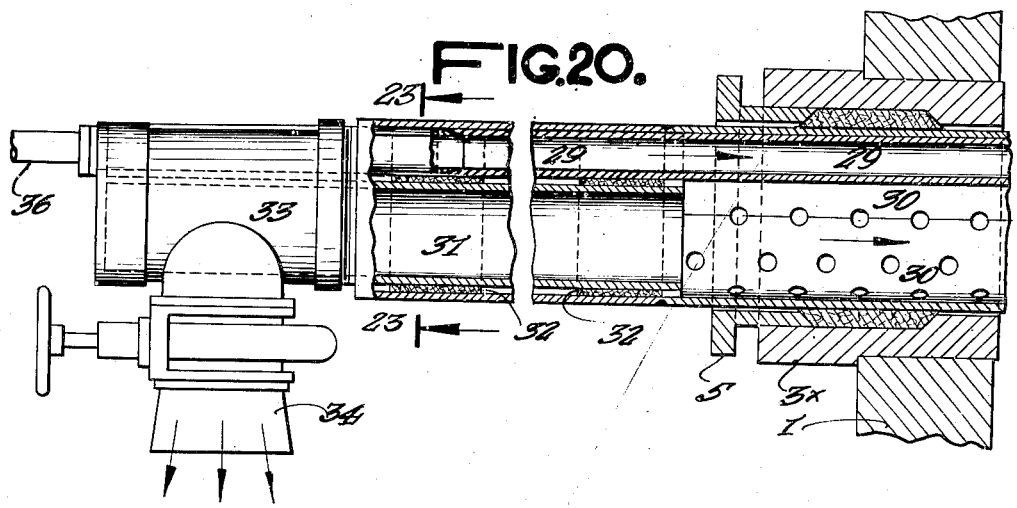
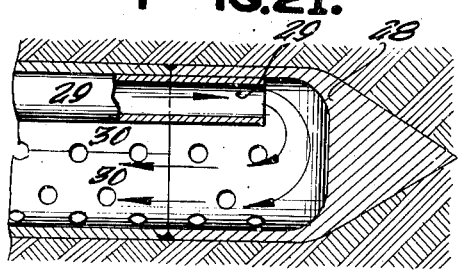
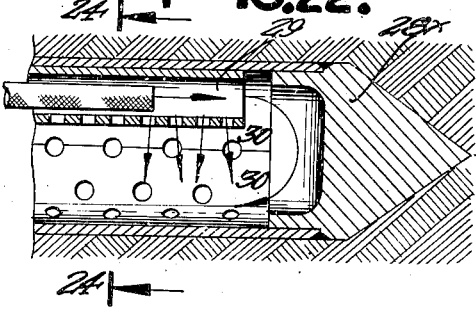
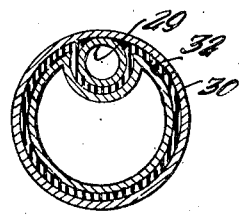
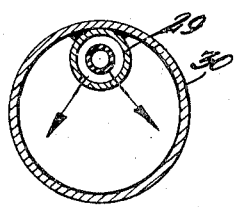
INVENTOR.
Ross Nebolsine
BY W. Leo Helius
ATTORNEY, Patented Aug. 28, 1945

2,383,496

UNITED STATES PATENT OFFICE 2,383,496

METHOD OF AND APPARATUS FOR INSTALLING LATERAL WELLS IN FLUID-SATURABLE EARTH

Ross Nebolsine, Seacliff, N. Y.

Application March 6, 1941, Serial No. 381,941

7 Claims. (Cl. 166—1)

This invention relates more particularly to well points leading from a chamber outwardly and laterally thereof, i. e., in horizontal or inclined direction, and to the control and disposal of inflow of material from the formation in which the installation is made or is being made. The well points are progressively driven outwardly from the interior of a chamber in such manner that there may be removed only that part of the formation necessary to installation of the well point, while the inflow of liquid, solid or gaseous material from the formation and its discharge into the chamber can be controlled or disposed of. Such control includes the use of fluid under pressure and directed in a special manner, the use of packing glands, valves, stoppers, pumps, and these and other features of the invention will be described in this specification, with reference to the accompanying drawings, in which—

Figure 1 is a view in sectional elevation through a chamber equipped with means for withdrawing liquid therefrom and with means for progressively driving well points laterally out of the chamber and from points interiorly thereof.

Figure 2 is a horizontal section on the line 2—2, Figure 1.

Figure 3 is an enlarged view, showing the relative positions of a well driving shoe, a perforated or apertured well casing, and a heavy outer casing employed in the driving of the well assembly through the formation.

Figure 4 is a vertical section on the line 4—4, Figure 3, indicating, as also does Figure 3, a fluid pressure pipe disposed within the perforated casing.

Figure 5 is a view similar to Figure 3, showing how the outer drive casing can be pulled back or somewhat retracted.

Figure 6 is a view similar to Figure 2, showing jack driving means for pushing the well assembly forward or pulling the outer casing backward.

Figure 7 is an enlarged fragmentary horizontal section through the chamber and through part of the outer casing and perforated casing section, certain jack elements being broken away.

Figure 8 is a detailed view in elevation of the oil-casing-type puller in engagement with the outer or drive casing, its enclosed perforated well section together with the fluid pressure pipe, being shown in section, as taken on the line 8—8, Figure 7.

Figure 9 is a fragmentary view in longitudinal section showing abutting sections of the drive casing and the removable threaded and bevelled couplings therefor. This form of connection may also be used for heavy screen casing or pipe sections when there is no outer casing.

Figure 10 is a vertical section on the line 10—10, Figure 9.

Figure 11 is a view similar to Figure 1, illustrating a modification employing perforated casings, each composed of two halves, which are laid about a fixed guide and supporting mandrel, which half sections are welded together thereafter and are driven forwardly by jack means with the employment of the mandrel as a support and guide. The mandrel also is used as a receiving pipe for the control of inflow of material into the chamber, the modification also including means for feeding a continuous length of fluid pressure hose within the lateral well casing.

Figure 12 is an enlarged view in longitudinal section taken through the initial or forward section of the well point through the nozzle end of the air hose, as illustrated generally in Figure 11.

Figure 13 is a vertical section on the line 13—13, Figure 12.

Figure 14 is an enlarged view in longitudinal section, illustrating a breakable connecton between a flexible inner hose near the forward open end of the lateral well casing.

Figure 15 is an enlarged view in longitudinal section through a chamber wall and looking interiorly thereof, showing perforated casings welded together at their contacting ends and mounted upon a fixed guide and supporting hollow mandrel or receiving pipe similar to that of Figure 11, the mandrel being employed as a receiving pipe for the control of inflow of material into the chamber, the mandrel being covered with a length of rubber or other sealing material.

Figure 15A is a detailed view in similar longitudinal section showing the use of a short sealing ring surrounding the mandrel.

Figure 16 is a view similar to Figure 15 in which only the chamber wall and the puller are in section, showing the position of the perforated casing after a forward movement by jack mechanism.

Figure 17 is a vertical section on the line 17—17, Figure 15.

Figure 18 is a detailed view in side elevation, partly broken away, showing the well driving point and immediately associated members of the general form shown in Figure 3 except that the well driving shoe is closed and pointed.

Figure 18A is a longitudinal section through the well driving point of Figure 18 and the perforated casing applied thereto.

Figure 19 is a view similar to Figure 18 but in full section, the outer driving casing being retracted.

Figure 20 is a vertical section through a portion of the chamber wall showing in longitudinal section a supporting and guide mandrel of special form for perforated casing, carrying a permanently fixed fluid pressure pipe length formed by abutting or interfitting sections, one pipe section being carried by each section of the perforated casing, the sections of the latter being welded together at their ends, the view also showing a control for the outlet from the interior of the mandrel.

Figure 21 is a view in longitudinal section showing a type of well point suitable for use with the structure of Figure 20 and showing the forward end of the fluid pressure pipe.

Figure 22 is a view similar to Figure 21 showing a modified form of inner pipe, the same being perforated and associated with a retractable fluid pressure hose.

Figure 23 is a transverse vertical section on the line 23—23, Figure 20.

Figure 24 is a transverse vertical section on the line 24—24, Figure 22.

Referring to the drawings, I have shown at A a chamber formed in the ground and closed at its base. Above a working platform 2 a suitable number of apertures will be formed in the wall 1 of the chamber; into these apertures are secured stuffing boxes of any suitable construction. The stuffing boxes may comprise headed sleeves such as shown at 3, Figure 15, enclosing a packing ring 4 engaged at one end by a headed pressure ring 5 and if desired bolts 6 may pass through a head of the ring and be threaded into sleeve 3 as shown in Figure 7.

Within the chamber, the latter being indicated at A, is an outflow riser 7 which passes through the working platform 2 and which may carry at its base a pump diagrammatically indicated at 8 connected to a pump drive 9.

My method employs lateral well casings consisting of perforated tubes 10 per se, or made up of perforated half round lengths 10x which are welded together to form tubes. Also, either open-end driving shoes 11 or closed pointed driving shoes 11x are employed.

The initial operation is to place into the stuffing box the forward portion of a lateral well casing carrying a well driving shoe 11 or 11x which may be welded to the perforated casing 10, the latter surrounding a reduced or neck section of the shoe so that its end abuts a heavy shoulder of the shoe as shown more particularly in Figures 3 and 5. Within this initial section of the perforated lateral well casing is placed a fluid pressure pipe 12 which extends lengthwise of the well casing, the front end of the pipe being so shaped as to insure a rearward or reverse movement of the fluid, as for example, that is injected. This forward section of the fluid pressure pipe may be secured to the well driving shoe or to the lateral well casing, if desired.

Within the chamber A and abutting opposite areas of the walls 1 is a suitable jack assembly adapted to give forward and backward movements to a clutch device 13 which may be of the oil casing puller type. As shown in Figure 7 the jack assembly may comprise a pair of forwardly located cylinders 14 and a pair of rearwardly located cylinders 14x, two piston rods 15 carrying the pulling element or clutch device 13, the latter being adapted to receive wedges 13x, Figure 15, which may be placed in forward position for forward propulsion of the lateral well casing, or which may be placed in rear position for reverse action of the puller.

The puller having thus been placed into engagement with the initial lateral well casing unit or assembly, the jack mechanism is operated to force the same and its well driving shoe into the porous formation outwardly of wall 1, and this may be done by employing a well casing assembly consisting of sections of thin wall perforated casing and applying the projecting force to a surrounding heavy imperforate casing 16, the latter also being formed in sections, and the forward end of the initial section directly engaging the well driving shoe which will be welded to the perforated casing. In such case the puller 13 will directly engage the imperforate casing 16 and not the perforated sections.

When the outer imperforate casing and the enclosed perforated well section with attached well driving shoe has been pushed outwardly into the formation surrounding wall 1 to a distance at which the rearward ends thereof are projected but a slight distance from the stuffing box, the jack mechanism is operated to retract the puller, whereupon an additional perforated casing may be secured to the first section by a welded or other connection and a second outer casing section may be connected to the first like section as by a coupling 17, a detail of which is shown in Figure 9. It will be seen that in this case the abutting ends of the two outer casing sections 16 are bevelled and threaded to correspond with the threaded reverse bevelled inner wall sections of the coupling 17 so that the outer face of the coupling will have a minimum projection beyond the outer face of the outer imperforate casing.

As the lateral well casing is formed and projected by connecting sections one after the other of both perforated and imperforate casing, the fluid pressure pipe will be built up and projected. The fluid pressure pipe may consist of coupled sections of pipe or hose or of other construction.

As the lateral well casing is driven outwardly, only that portion of the ground formation will be removed as is necessary to install the well casing. The porous ground formation usually will contain water. Water, and solid material carried thereby, to a proportion determined by the character of the formation, will pass through the lateral well casing into chamber A. In cases where the forward end of the lateral well casing is equipped with a closed point rather than an open shoe, as in Figures 18 and 19, then the water and solid material will enter through the perforations of the inner casing when the outer imperforate casing is retracted as in Figure 19. This entering material receives a blast of air or liquid directed rearwardly of the lateral well casing and towards the chamber and the material entering the lateral wall casing is carried back to the end of the rearward section for discharge through an aperture at 2x in the working platform 2 for removal by the pump 8.

Whenever required, the outer imperforate casing 16 may be retracted so as to expose a forward end section of the perforated casing 10 so that air and liquid under pressure may be forced outwardly through the perforations to agitate the adjacent ground tending to clog the perforations, and to aid in cleaning out the perforations by accelerating the flow towards the chamber.

In the structure shown in Figures 18, 18A and 19, the forward end of the well casing 10 is equipped with a closed point. In this case also the outer imperforate casing 16 is driven forwardly by the clutch device 13 of the jack assembly shown in Fig. 1, and threby the said imperforate casing may be retracted to the extent desired, after a driving operation, so as to enable the use of air streams through the perforations to clear them from any clogging silt or other material and to enable passage into the interior of the perforated casing, and through same into chamber A, of liquid and solid material from the adjacent ground.

In the structure shown in Figures 11 to 17 inclusive, and Fig. 18a, the lateral well casing is made up without the outer imperforate casing, the perforated casing consisting in this case of half-round lengths for each section. These lengths are indicated at 10x. A hollow mandrel 18, or receiving pipe best shown in Figures 15 to 17 inclusive, is employed for the mounting and guiding of the perforated lengths. It is a member having its forward end within the stuffing box. At its rear end, within the chamber A, it is held against forward movement by suitable means (not shown). The mandrel can be closed by a cap 19 having a packing gland engaged by pressure plug 20, the cap being apertured to receive the fluid pressure pipe or hose 21. Discharge of liquid and solid material from the hollow mandrel may be controlled by a suitable valve device 22.

The mandrel may be equipped with an outer sealing sheath of rubber or other material, 23, and this sheath receives the half-round lengths of the perforated casing sections and supports the same while they are welded to each other and to a preceding perforated section. When rubber is used for the sealing sheath, it may be outwardly faced with a heat-resisting material such as asbestos, to resist the welding heat.

In Figure 16 I have shown one of the perforated casing sections engaged by the puller 13 at the end of a stroke of the latter. The puller may now be retracted to substantially the end of the perforated casing for another active stroke. Finally, with the end of the perforated casing slightly projecting from the stuffing box the puller 13 is fully retracted, and a further perforated casing section is built up by laying two half-round lengths upon the mandrel and by welding them to each other and to the preceding perforated casing section. The rubber sheath surrounding the length of the hollow mandrel or receiving pipe can be replaced by a shorter outer cylindrical packing opposite the stuffing box, as shown at 32, Figure 20.

In Figure 11 the air pipe is a flexible hose 21x which may be fed from a reel 24, and the flow of pressure liquid may be controlled by a simple form of clamp, diagrammatically indicated at 25, which is releasable from engagement with the hose.

The fluid pressure hose 21xx may, as shown in Figure 12, be connected to a fluid pressure discharge nozzle 27 having air holes rearwardly directed as indicated by the arrows at a, and the hose may be of such construction that it can be pushed forwardly into the perforated casing at each of the driven progressions thereof or even moved back and forth after the lateral well casing has been completed. The advantage of such arrangement is that the air discharge nozzle 27 may direct the major force of the pressure fluid at any desired portions of the perforated casing and the ground adjacent thereto, and the hose and nozzle may be moved into and out of the lateral well casing whenever desired.

In place of the hollow mandrel, one can use a hose of a diameter slightly less than the interior diameter of the perforated casings (Figure 14). This hose is attached to the forward end of the perforated casing by means of a weakened section 26, so that upon completion of the lateral well casing this hose can be broken away and withdrawn, thus effecting communication between the ground and the interior of the well casing and chamber A.

In Figures 20 to 24 the perforated casing at its forward section is permanently connected to a well driving point 28, or 28x. Within the perforated casing are permanently attached sections of a small diameter pipe 29. This pipe facilitates the application of air and liquid pressure to the lateral well casing either during or after installation of the latter. The mandrel 31 is provided near each end with a packing sleeve 32 and the mandrel leads to a valve head 33 carrying a discharge valve 34 for the liquid and solids carried into the mandrel from the lateral well in the progress of its construction. The mandrel and valve head 33 are formed with longitudinally arranged open channels to receive the pipe 29. The rear end of each section of pipe 29 projects rearwardly beyond the valve head 33.

For proper connection of succeeding sections of pipe 29, it is preferred that each pipe section at one end be inset relatively to the surrounding perforated casing section and at the other end it projects beyond the casing so that the end of one pipe section will pass into a succeeding perforated casing section and will directly abut the pipe carried by that section. To form a close fit the inner wall of one pipe may be bevelled at its end and the outer wall of the abutting pipe may be bevelled correspondingly to better receive it.

It will be seen from the foregoing, that the invention provides means and a method of forcing back, by fluid pressure in addition to the hydrostatic pressure of the liquid in the ground formation, of the materials displaced by the well casing or materials which pass into the same through the perforated casing, so that such materials are carried into the chamber A. Also, such positive and rearward fluid pressure action may continue throughout the outward progression of the well casing sections or during periods thereof, as desired. It will also be seen that blast of fluid pressure may at will be directed to any desired section of the lateral well casing. The ground materials coming into the well casings of the general type, have, in methods formerly proposed, received only the hydrostatic pressure of the head liquids in the ground formation, which in some cases will be inadequate to prevent clogging. According to the present invention such hydrostatic pressure will assist the action of the fluid rearwardly directed pressure, which will take the path of least resistance, i. e., rearwardly through the perforated casing to the chamber A, because the interior of the chamber is under lesser pressure.

The invention facilitates removal of material from the well casing by continuously blowing of the material rearwardly into the chamber A.

The inflow of material into chamber A from the well casing is under control at all times. Hence, whenever desired, pressure may be built up in the lateral well casing so as to have full effect through all or selected areas of the perforated casing. Thus the imperforate heavy casing 16 may be retracted so that fluid pressure entering the perforated casing 10 may exert its force primarily at the forward end of the perforated casing and intermediate outward progressive movements of the well casing assembly.

By the use of the mandrel, which in itself is a receiving element for the passage of material from the well casing into the chamber A, the perforated well casing sections may be built up and pushed forward without interfering in any way with the flow of ground material into the chamber. Furthermore, the path of movement of the ground material through the lateral well casing and into the chamber comprises the annular area of the well casing and not the interior of a special and smaller discharge pipe extending through the lateral well casing, as heretofore used. The small diameter of my fluid pressure pipe affords retarding influence to the flow of the ground material, through the cross section of the lateral well casing and the effect of this fluid pressure is to clear out the lateral well casing and the main action thereof may be upon any section of the lateral well casing and the adjacent ground for such cleaning action, in addition to beneficial influence upon the rate of flow.

Having described my invention, what I claim and desire to secure by Letters Patent is as follows:

1. A method of installing lateral perforated well casing sections from the interior of a chamber bounded by a chamber wall and adapted to receive ground material from the perforated well casing, formed by said sections, which comprises laying perforated semi-round metallic lengths upon a supporting mandrel adjacent an aperture in said wall, connecting said lengths to form a tubular section, forcing said section into the ground formation exterior the casing but with the rear end of the section exposed, forming a second tubular section in the same manner as the first section and connecting it to said first section, forcing the two sections forwardly into the said ground formation and repeating the aforementioned operations until a desired length of perforated well casing has been projected.

2. A method in accordance with claim 1, in combination with the step of effecting the flow into the chamber, from the mandrel, of ground material passing into the perforated well casing in the course of its building up and progression, under the influence of the hydrostatic pressure of the liquid in said ground formation.

3. A method in accordance with claim 1, in combination with the step of effecting the flow into the chamber from the mandrel of ground material passing into the perforated well casing in the course of its building up and progression, under the influence of the hydrostatic pressure of the water in said ground formation and the action of fluid under pressure passed simultaneously to the exterior ground formation and to the outward end of the well casing under construction and directed rearwardly of said forward end of the casing.

4. Means for constructing liquid-handling apparatus comprising a chamber extending below the normal ground liquid level and having a chamber wall, a stuffing box within an aperture of the wall, a hollow mandrel received by the stuffing box and projected within the chamber, means controlling the flow of material from the mandrel and into the chamber, semi-cylindrical perforated metallic lengths adapted to be received upon the mandrel to form a well casing section, in combination with means for forcing said lengths into the ground formation laterally of the chamber.

5. In conjunction with a concrete walled well having openings in the lower portion thereof, apparatus for drilling horizontally and outwardly from the said well comprising, in combination, a sleeve secured in the said wall opening, a tubular mandrel disposed through the said sleeve and extending into the interior of the said well, the said mandrel being supported against longitudinal movement and in concentric relation to the said sleeve to provide an annular space, a plurality of semi-circular perforated tube lengths adapted to be placed about the said mandrel to form a tube passable through the said annular space, ground piercing means secured at the head of the initial one of the said perforated tubes, and means operative upon the said perforated tube lengths placed on the mandrel within the said well for motivating the said piercing means and for projecting the said added perforated tube lengths outwardly from the well.

6. The combination according to claim 5, wherein the said mandrel is covered by a sheath, the outward face of which is provided with a heat-resisting material to withstand the heat in welding the said semi-circular perforated tube lengths to form a continuous perforated tube.

7. The combination according to claim 5, wherein the end of the said tubular mandrel opening in the said well is provided with a cap having an aperture, and a conduit for fluid pressure disposed through the said aperture of the cap and in concentric relation to the said outwardly projected perforated tube.

ROSS NEBOLSINE.